(12) United States Patent
Long et al.

(10) Patent No.: US 7,255,924 B2
(45) Date of Patent: Aug. 14, 2007

(54) CARBON NANOARCHITECTURES WITH ULTRATHIN, CONFORMAL POLYMER COATINGS FOR ELECTROCHEMICAL CAPACITORS

(75) Inventors: Jeffrey W. Long, Alexandria, VA (US); Debra R. Rolison, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 479 days.

(21) Appl. No.: 10/756,887

(22) Filed: Jan. 13, 2004

(65) Prior Publication Data

US 2005/0153130 A1 Jul. 14, 2005

(51) Int. Cl.
*B32B 9/00* (2006.01)
(52) U.S. Cl. .................................................... 428/408
(58) Field of Classification Search ............... 428/408; 361/302; 423/447.1
See application file for complete search history.

(56) References Cited

U.S. PATENT DOCUMENTS 5,898,564 A 4/1999 Mayer et al.
6,383,640 B1 5/2002 Shi et al.
2002/0089807 A1* 7/2002 Bluvstein et al. ........... 361/302

OTHER PUBLICATIONS

Li et al, "Carbon Aerogels Derived From Cresol-Resorcinol-Formaldehyde for Supercapacitors", Elsevier Science Ltd., Jul. 31, 2002, pp. 2955-2959, vol. 40.
Talbi et al, "Electropolymerization of Aniline on Carbonized Polyacrylonitrile Aerogel Electrodes: Application for Supercapacitors", Journal of Applied Electrochemistry, Feb. 25, 2003, pp. 465-473, vol. 33.
Long et al, "Ultrathin, Conformal Polymer Coatings as Separators at Nanostructured Metal Oxides Used For Energy Storage", Naval Research Laboratory, U.S. Appl. No. 10/601,881, filed Jun. 24, 2003.

* cited by examiner

*Primary Examiner*—John J. Zimmerman
*Assistant Examiner*—Daniel Miller
(74) *Attorney, Agent, or Firm*—John J. Karasek; Joseph T. Grunkemeyer

(57) ABSTRACT

A composite having an electroactive polymer coating on a porous carbon structure is disclosed. The composite may be used in capacitor electrodes. The composite may be made by self-limiting electropolymerization of a monomer on the carbon structure.

18 Claims, 3 Drawing Sheets

CARBON NANOARCHITECTURES WITH ULTRATHIN, CONFORMAL POLYMER COATINGS FOR ELECTROCHEMICAL CAPACITORS

BACKGROUND OF THE INVENTION

1. Field of the Invention

The present invention relates generally to composites that may be used in energy storage devices.

2. Description of the Prior Art

Electrochemical capacitors (also denoted as supercapacitors or ultracapacitors) are a class of energy-storage materials that offer significant promise in bridging the performance gap between the high energy density of batteries and the high power density derived-from dielectric capacitors. Energy storage in an electrochemical capacitor is accomplished by two principal mechanisms: double-layer capacitance and pseudocapacitance. Double-layer capacitance arises from the separation of charge that occurs at an electrified interface. With this mechanism the capacitance is related to the active electrode surface area, with practical capacitances in liquid electrolytes of 10-40 $\mu F/cm^2$. Electrochemical capacitors based on double-layer capacitance are typically designed with high-surface-area carbon electrodes, including carbon aerogels, foams, and papers. (Frackowiak et al., *Carbon*, 39, 937 (2001). All referenced patents and publications are incorporated by reference.) Carbon aerogels are particularly attractive due to their high surface areas, high porosities, and excellent conductivities (>40 S/cm) (Pekala et al., *J. Non-Cryst. Solids*, 225, 74 (1998)).

Pseudocapacitance broadly describes Faradaic reactions whose discharge profiles mimic those of double-layer capacitors. Because this mechanism involves true electron-transfer reactions and is not strictly limited to the electrode surface, materials exhibiting pseudocapacitance often have higher energy densities relative to double-layer capacitors. The main classes of materials being researched for their pseudocapacitance are transition metal oxides, conductive nitrides, and conducting polymers. At present, some of the best candidates for electrochemical capacitors are based on nanoscale forms of mixed ion-electron conducting metal oxides and hydrous metal oxides, such as $RuO_2$, which store charge via a cation-electron insertion mechanism, as shown in equation (1).

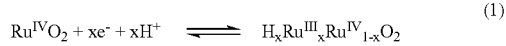
(1)

Electrodes based on disordered, hydrous $RuO_2$ yield specific capacitances as high as 720 F/g (Zheng et al., *J. Electrochem. Soc.*, 142, 2699 (1995)). The application of $RuO_2$ is limited however by the high costs of the ruthenium precursors.

Electronically conducting polymers store charge by a doping/de-doping process where electronic state changes in the polymer are compensated by cation or anion incorporation from the supporting electrolyte. Examples of relevant conducting polymers include polyaniline (equation (2)), polypyrrole, polythiophene, polyacetylene, and their derivatives. Because this Faradaic doping process occurs through the bulk volume of the polymer, high energy densities are accessible, as observed with the metal oxides. However, conducting polymers offer the advantage of lower costs relative to those for noble metal oxides. A potential disadvantage for conducting polymers is their somewhat lower conductivities (1-100 S/cm) compared to carbon-based capacitors. The conductivity of such polymers also undergoes modulations as they are electrochemically cycled between the doped (conducting) and de-doped (insulating) state. Conducting polymer electrodes are typically fabricated by electrodepositing thick (up to 10 $\mu$m) coatings onto carbon paper, thus their electrical properties may restrict their overall rates of charge and discharge for deep levels of de-doping (A. Rudge et al., *J. Power Sources*, 47, 89 (1994)).

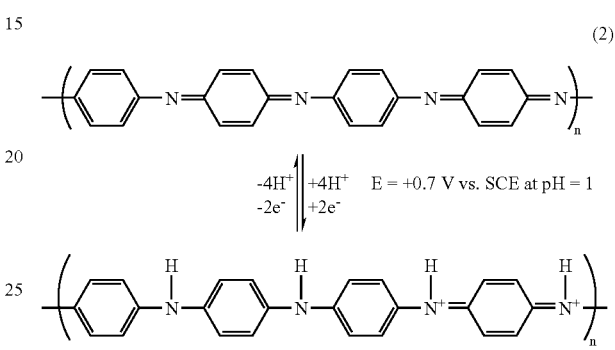
(2)

SUMMARY OF THE INVENTION

The invention comprises a composite of a porous carbon structure comprising a surface and pores, and an electroactive polymer coating on the surface. The coating does not completely fill or obstruct a majority of the pores.

The invention further comprises a capacitor comprising an anode, a cathode, an electrolyte, and a current collector. The anode, the cathode, or both comprise the above composite. The current collector is in electrical contact with the composite.

The invention further comprises a method of forming a composite comprising the steps of: providing porous carbon structure comprising a surface and pores; infiltrating the structure with a monomer which can form an electroactive polymer; and electropolymerizing the monomer forming a coating on the surface comprising the electroactive polymer without completely filling or obstructing a majority of the pores.

The invention further comprises a method of storing charge comprising the steps of: providing the above capacitor and charging the capacitor.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

Conducting polymer/carbon aerogel hybrid architectures may be made by using electropolymerization to apply ultrathin, conformal polymer coatings to pre-formed, highly conductive carbon aerogel electrodes. These nanostructured hybrids may be designed as electrode materials for high-energy-density electrochemical capacitors. Carbon aerogels (also denoted as carbon nanofoams) may serve as high surface area, highly porous, conductive electrode structures. Ultrathin polymer coatings can be applied to these structures by electropolymerization using experimental conditions whereby polymer growth is self-limiting. Using this approach, polymers can be grown on the three-dimensional carbon electrode surface without occluding or filling the porosity of the carbon aerogel. The resulting hybrid structures may exhibit enhanced gravimetric and volumetric capacitance when electrochemically cycled in aqueous acid electrolytes.

Figure 1:
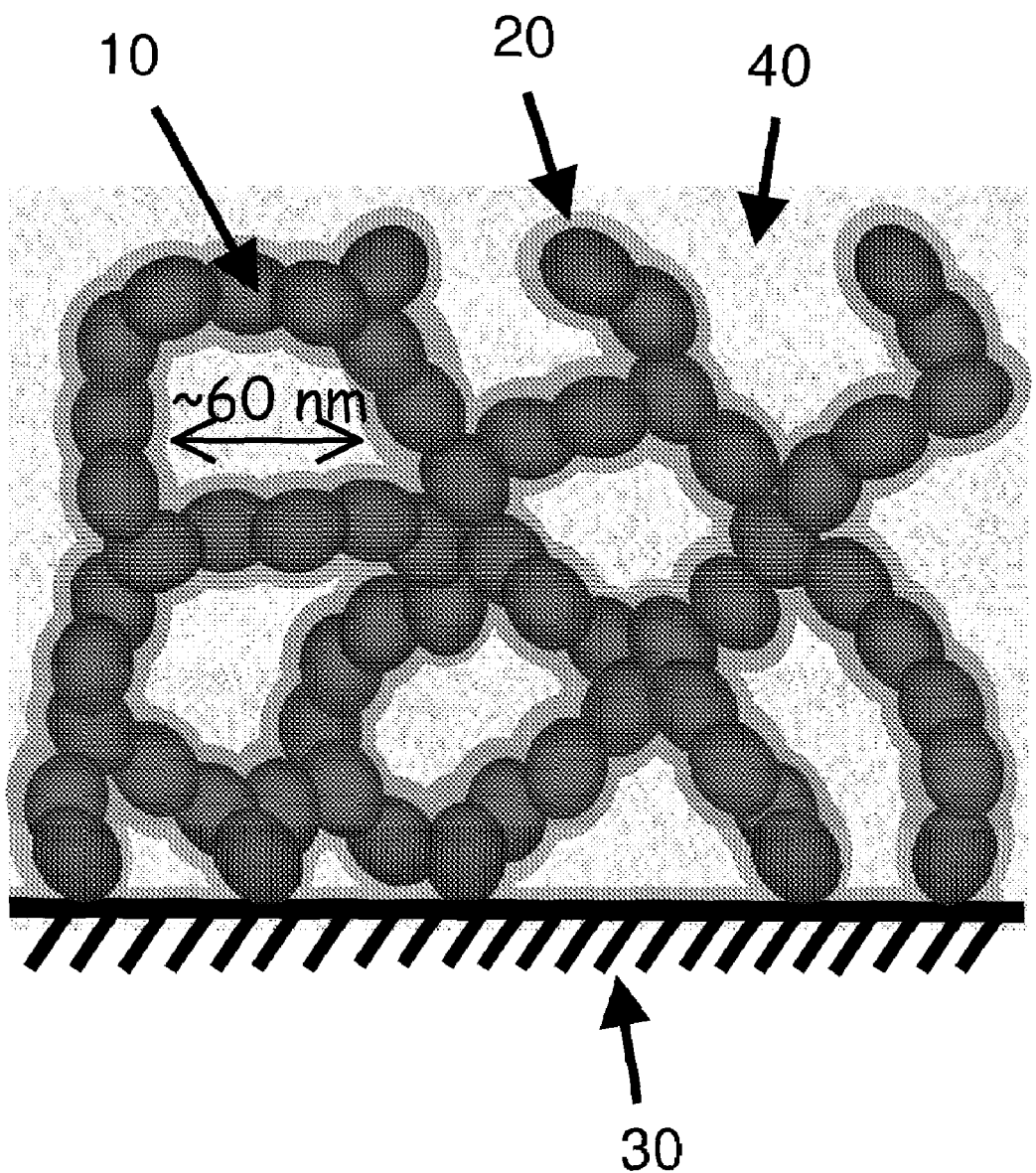
FIG. 1 schematically illustrates part of one electrode of a capacitor using the composite of the invention.

FIG. 1 schematically illustrates one electrode of a capacitor using the composite of the invention. The carbon aerogel 10 has a coating of conducting polymer 20, and is electrically connected to a current collector 30. An electrolyte 40 permeates the composite and is in contact with the entire coating.

Any porous carbon structure, or combinations thereof may be used to make the composite including microporous, mesoporous, and macroporous forms possessing a continuous pore network. Suitable forms of porous carbon include, but are not limited to carbon aerogel, carbon nanofoam, and templated mesoporous carbon. Carbon aerogels may be prepared according to methods disclosed in Bock et al., *J. Non-Cryst. Solids*, 225, 69 (1998), Pekala et al., U.S. Pat. No. 4,873,218, and Pekala et al., U.S. Pat. No. 4,997,804, or by other suitable methods. A suitable average pore size in the porous carbon structure is about 2 nm to about 1 μm in diameter.

The polymer may be any electroactive polymer, or combinations thereof. Suitable electroactive polymers include, but are not limited to, a conductive polymer, a redox polymer, a polyaniline, a polyarylamine, a polypyrrole, a polythiophene, a polyacetylene, and their respective derivatives.

A monomer that polymerizes to an electroactive polymer may be used to form the polymer coating on the surface of the carbon. A suitable method of infiltrating the carbon with the monomer is to immerse the carbon in a solution of the monomer. A typical monomer solution may contain 10 mM monomer, 0.2 M $Na_2SO_4$ as an electrolyte, and 50 mM of a citrate buffer to maintain the solution pH at a value of 4.7.

Electropolymerization may be performed by flowing a current through the carbon and monomer solution. If the electropolymerization is done at a high enough pH, then the resulting polymer coating may be nonconducting. This property will limit the thickness of the coating such that a majority of the pores are not completely filled or obstructed. A majority means at least 50%, but may be as much as 70%, 90%, 99%, or more. An obstructed pore is one that is not completely filled with polymer, but is one that has blocked openings such that an electrolyte could not enter the pore. It is to be understood that some pores could end up being filled or obstructed due to variations in coating thickness and pore size, and that such would be within the scope of the invention.

Electropolymerization schemes involving such monomers as o-phenylenediamine, aniline, o-aminophenol, and o-methoxyaniline may be used. When performed in aqueous electrolytes with pH>1, the electro-oxidization of these monomers can result in ultrathin (<10 nm) coatings of polymer at the electrode surface. Film formation can be self-limiting due to the poor electronic conductivity and minimal swelling of the growing polymer. By choosing self-limiting growth conditions, conformal polymer coatings can be applied over the entire electroactive area of the high-surface-area electrode, while not occluding or filling the through-porous structure of the carbon aerogel. Although these polymer films may be grown under solution conditions where they are insulating or poorly conductive, when transferred to an acidic aqueous electrolyte the polymers can be converted to their electroactive state and contribute a significant pseudocapacitance to the hybrid structure. Some examples of monomers that lead to such self-limited polymer coatings are shown in equation (3).

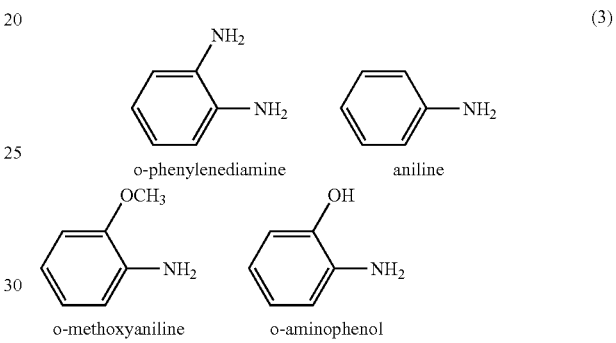

(3)

o-phenylenediamine    aniline
o-methoxyaniline    o-aminophenol

A capacitor electrode may be made using the composite. The composite is placed in electrical contact with a current collector such as a lead. The composite is at least partly immersed in an electrolyte, such as sulfuric acid, aqueous acid, or a protonic ionic liquid. A second electrode, which may also comprise the composite, is also placed in contact with the electrolyte. The capacitor may then be charged.

The composite may offer several performance enhancements when used as an electrochemical capacitor. Adding the polymer component to the carbon aerogel can increase the specific capacitance of the hybrid through the Faradaic pseudocapacitance of the polymer, even after accounting for the additional mass of the polymer. These hybrid structures offer even greater enhancement when the volumetric capacitance is considered. Due to the porous structure of the carbon aerogel and the limited growth of the polymer, the bulk volume of carbon aerogel structure is virtually unaltered by the addition of the polymer component. Thus, all additional capacitance from the conducting polymer can contribute directly to increasing the volumetric capacitance of the hybrid.

Because the composites are designed to retain the high porosity of the initial carbon aerogel, substantial gains in total capacitance are achieved without significantly sacrificing charge-discharge rate capability. In this configuration the carbon∥polymer∥electrolyte interface may not exceed ~10 nm across, and performance limitations due to the conductor-to-insulator transition of the polymer can be minimized. This configuration can also exploit the short transport lengths of dopant ions from the infiltrated electrolyte into the ultrathin polymer coating.

The use of self-limiting electropolymerization conditions described herein may not require the careful electrochemical control that would otherwise be necessary to coat a highly porous electrode while still retaining the porous architecture. For example, the use of a short potential pulse under non-limiting conditions may be used, but may result in poor control of film thickness. This protocol may result, though not necessarily, in filling or obstructing an unacceptable number of pores.

Having described the invention, the following examples are given to illustrate specific applications of the invention. These specific examples are not intended to limit the scope of the invention described in this application.

EXAMPLE 1

Electropolymerization—Carbon aerogels were prepared according to established procedures (V. Bock et al., *J. Non-Cryst. Solids*, 225, 69 (1998)). Monolithic pieces of carbon aerogel (2-4 mg) were incorporated into a stainless-steel basket electrode, which provided for electrical contact between the aerogel and a potentiostat/galvanostat. This assembly was equilibrated in a hydration chamber for 24 hours to wet the carbon surfaces, then immersed in an initial electrolyte and evacuated for 2 hr. This procedure was used to efficiently infiltrate the porous carbon structure with electrolyte. The equilibrated electrode assembly was immersed in an electrolyte containing 20 mM oxidizable monomer, such as o-methoxyaniline, 0.2 M $Na_2SO_4$, and 50 mM citrate buffer. Polymerization of the monomer was initiated using a number of electrochemical techniques including voltammetric, potentiostatic, galvanostatic, potential-pulse, and current-pulse methods. For the class of aniline-based monomers studied here, the oxidation of the monomers occurs at potentials between 0.2 and 0.6 V. The electropolymerization step was always performed under conditions where the polymer growth was self-limiting and resulted in polymer coatings less than 10-nm thick. For electropolymerization from arylamine monomers this typically requires an aqueous monomer solution with pH>1. When these self-limiting conditions are employed, these polymer coatings did not exceed ~15 nm in thickness, no matter what electrochemical method was applied. The results shown in FIGS. 2 and 3 were obtained from a composite made by applying a series of potential pulses: pulsing at 1.0 V for 15 seconds followed by a pulse at 0 V for 60 seconds, with a total of 200 pulse cycles. The solution for the polymer deposition was 20 mM o-methoxyaniline in 0.2 M $Na_2SO_4$, buffered at pH 4.7.

EXAMPLE 2

Electrochemical characterization—Following the electropolymerization step, the electrode assembly was transferred to an aqueous acid electrolyte, typically 0.1 M $H_2SO_4$, for electrochemical characterization. Under these acidic conditions the ultrathin polymer coating became electroactive. The overall electrochemical capacitance of the hybrid structure was increased by the pseudocapacitance of the activated polymer component. Galvanostatic (constant-current) charge-discharge cycling was used to assess the capacitance of the electrode as a function of the current load and the number of cycles.

Figure 2:
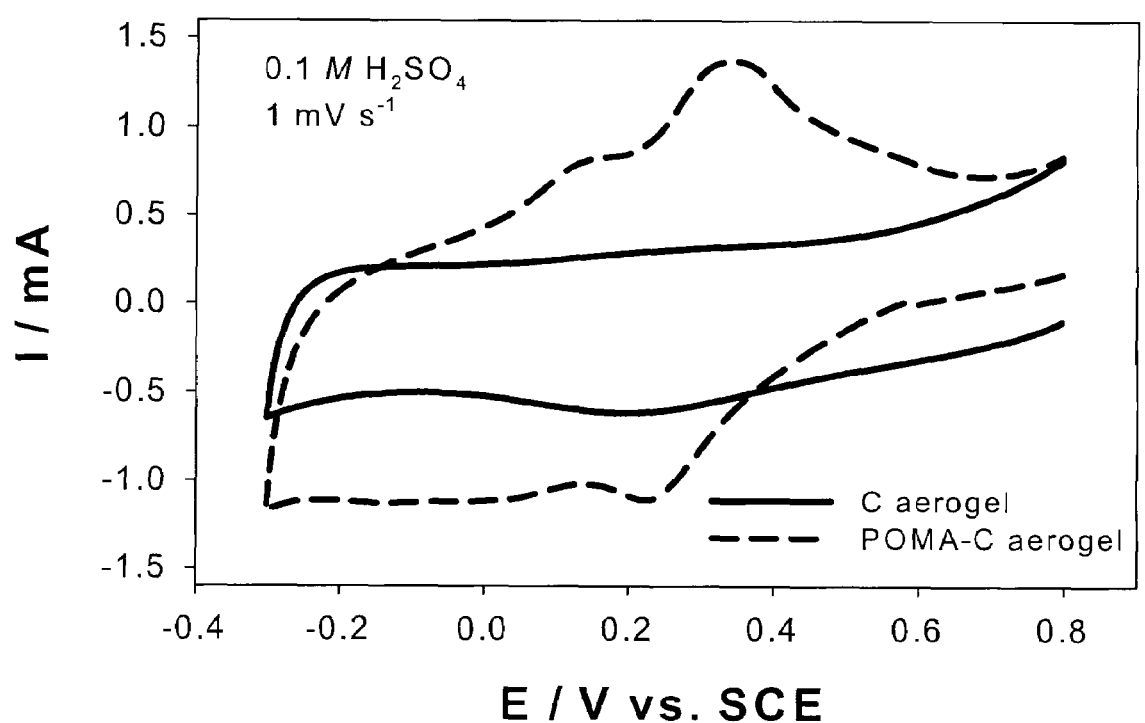
FIG. 2 shows a comparison of cyclic voltammograms of a carbon aerogel and a poly(o-methoxyaniline)-coated carbon aerogel.
Figure 3:
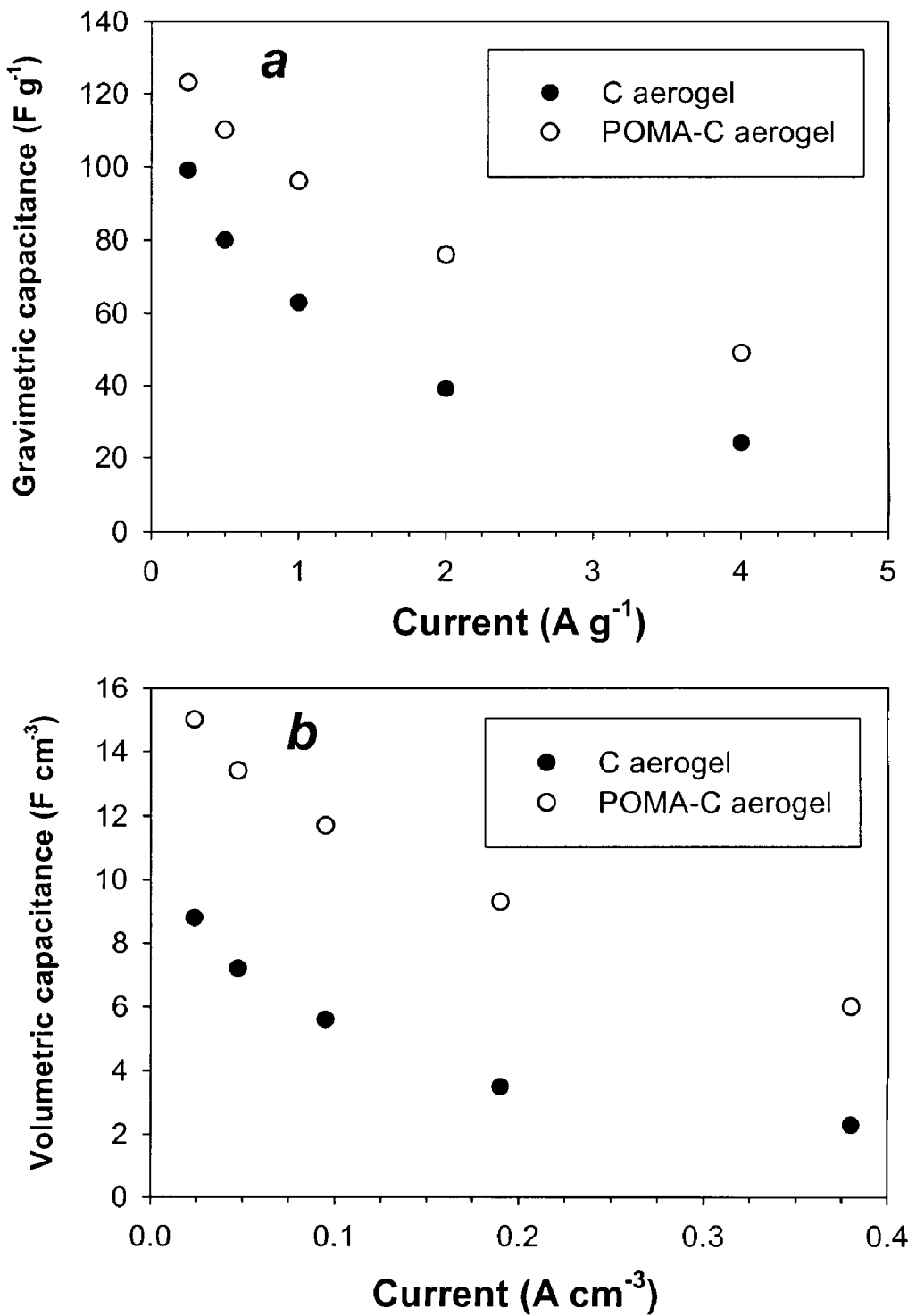
FIG. 3 shows a comparison of gravimetric and volumetric capacitances of a carbon aerogel and a poly(o-methoxyaniline)-coated carbon aerogel.

FIG. 2 shows a comparison of cyclic voltammograms of a carbon aerogel and a poly(o-methoxyaniline)-coated carbon aerogel. This comparison shows the presence of the peaks for the oxidation and reduction of the POMA coating at the carbon aerogel electrode.

With a carbon aerogel coated with poly(o-methoxyaniline), POMA, the gravimetric capacitance was increased ~35% for a current load of 0.5 $A \cdot g^{-1}$ and ~100% for a higher current load of 4 $A \cdot g^{-1}$ (FIG. 3a). For these same current loads the volumetric capacitance was enhanced even greater, with increases of ~90% and 270%, respectively (see FIG. 3b). The gravimetric capacitance values for the POMA-carbon hybrid took into account the additional mass of the polymer component, ~26 wt % of the composite. The volumetric capacitance values were derived based on the envelope volume of the initial carbon aerogel, which was unaltered by the addition of the polymer coating.

Obviously, many modifications and variations of the present invention are possible in light of the above teachings. It is therefore to be understood that the claimed invention may be practiced otherwise than as specifically described.

What is claimed is:

1. A composite comprising
    a porous carbon structure comprising a surface and pores; and
    a coating on the surface comprising an electroactive polymer;
        wherein the coating does not completely fill or obstruct a majority of the pores;
        wherein the coating is formed by self-limiting electropolymerization and does not exceed about 15 nanometers in thickness.

2. The composite of claim 1, wherein the structure is a carbon aerogel.

3. The composite of claim 1, wherein the structure is selected from the group consisting of carbon nanofoam and templated mesoporous carbon.

4. The composite of claim 1, wherein the pores have an average diameter of from about 2 nm to about 1 μm.

5. The composite of claim 1, wherein the polymer is a conductive polymer.

6. The composite of claim 1, wherein the polymer is a polyaniline or derivative thereof.

7. The composite of claim 1, wherein the polymer is selected from group consisting of a redox polymer, a polyarylamine, a polypyrrole, polyacetylene, a polythiophene, and derivatives thereof.

8. The composite of claim 1, wherein the coating has a thickness of no more than about 10 nm.

9. A capacitor comprising an anode, a cathode, and an electrolyte, wherein the anode, the cathode, or both comprise:
    a composite comprising
        a porous carbon structure comprising a surface and pores; and
        a coating on the surface comprising an electroactive polymer;
            wherein the coating does not completely fill or obstruct a majority of the pores; and
            wherein the coating is formed by self-limiting electropolymerization and does not exceed about 15 nanometers in thickness; and
    a current collector in electrical contact with the composite.

10. The capacitor of claim 9, wherein the structure is a carbon aerogel.

11. The capacitor of claim 9, wherein the structure is selected from the group consisting of carbon nanofoam and templated mesoporous carbon.

12. The capacitor of claim 9, wherein the pores have an average diameter of from about 2 nm to about 1 µm.

13. The capacitor of claim 9, wherein the polymer is a conductive polymer.

14. The capacitor of claim 9, wherein the polymer is a polyaniline or derivative thereof.

15. The capacitor of claim 9, wherein the polymer is selected from group consisting of a redox polymer, a polyarylamine, a polypyrrole, polyacetylene, a polythiophene, and derivatives thereof.

16. The capacitor of claim 9, wherein the coating has a thickness of no more than about 10 nm.

17. The capacitor of claim 9, wherein the electrolyte comprises sulfuric acid.

18. The capacitor of claim 9, wherein the electrolyte comprises a liquid selected from the group consisting of an aqueous acid and a protonic ionic liquid.

* * * * *